US008725469B2

(12) United States Patent
Johansson et al.

(10) Patent No.: US 8,725,469 B2
(45) Date of Patent: May 13, 2014

(54) OPTIMIZATION OF DATA PROCESSING PARAMETERS

(75) Inventors: Erik Axel Johansson, Umeå (SE); Nils Johan Trygg, Umeå (SE); Mattias Alexander Eliasson, Umeå (SE)

(73) Assignee: MKS Instruments, Inc., Andover, MA (US)

( * ) Notice: Subject to any disclaimer, the term of this patent is extended or adjusted under 35 U.S.C. 154(b) by 509 days.

(21) Appl. No.: 13/039,818

(22) Filed: Mar. 3, 2011

(65) Prior Publication Data

US 2012/0227043 A1 Sep. 6, 2012

(51) Int. Cl.
*G06F 7/60* (2006.01)
*G06F 17/10* (2006.01)

(52) U.S. Cl.
USPC .......................................................... 703/2

(58) Field of Classification Search
USPC .......................................................... 703/2
See application file for complete search history.

(56) References Cited

U.S. PATENT DOCUMENTS

| | | | |
|---|---|---|---|
| 4,710,864 A | 12/1987 | Li | |
| 5,446,681 A * | 8/1995 | Gethner et al. | 702/27 |
| 7,189,964 B2 | 3/2007 | Castro-Perez et al. | |
| 7,956,761 B2 | 6/2011 | Polak et al. | |
| 8,086,327 B2 | 12/2011 | Wikstrom et al. | |
| 2003/0154044 A1* | 8/2003 | Lundstedt et al. | 702/104 |
| 2005/0061967 A1* | 3/2005 | Shvartsburg et al. | 250/288 |
| 2006/0155486 A1* | 7/2006 | Walsh et al. | 702/32 |
| 2007/0143037 A1* | 6/2007 | Lundstedt et al. | 702/30 |
| 2011/0054864 A1* | 3/2011 | Lundstedt et al. | 703/2 |
| 2011/0282169 A1* | 11/2011 | Grudic et al. | 600/324 |

FOREIGN PATENT DOCUMENTS

| | | |
|---|---|---|
| WO | 0051045 | 8/2000 |
| WO | 2004038602 | 5/2004 |

OTHER PUBLICATIONS

A.J., et al., "Extraction and Gc/Ms Analysis of the Human Blood Plasma Metabolome," Analytical Chemistry, 2005. 77(24): p. 8086-8094.
Gullberg, J., et al., "Design of Experiments: An Efficient Strategy to Identify Factors Influencing Extraction and Derivation of *Arabidopsis thaliana* samples in metabolomic studies with gas chromatogrpahy/mass spectrometry," Analytical Biochemistry, 2004. 331(2): p. 283-295.
Internatioanl Search Report and Written Opinion from co-pending PCT application No. PCT/US2012/027087, dated Apr. 4, 2012, 9 pages.
Katajamaa, M. and M. Oresic, "Data Processing for Mass Spectrometry-Based Metabolomics," Journal of Chromatography A, 2007. 1158(1-2): p. 318-328.
Lindon, J.C., et al., "Summary Recommendations for Standardization and Reporting of Metabolic Analyses," Nature Biotechnology, 2005. 23(7): p. 833-838.

(Continued)

*Primary Examiner* — Dwin M Craig
(74) *Attorney, Agent, or Firm* — Proskauer Rose LLP

(57) ABSTRACT

Described are computer-based methods and apparatuses, including computer program products, for optimizing data processing parameters. A data set is received that represents a plurality of samples. The data set is processed using a data processing algorithm that includes one or more processing stages, each stage using a respective first set of data processing parameters to generate processed data. A design of experiment model is generated for the data processing algorithm based on the processed data and a set of response values. For each stage of the data processing algorithm, a second set of data processing parameters is calculated based on at least the design of experiment model.

39 Claims, 7 Drawing Sheets

(56) References Cited

OTHER PUBLICATIONS

R Development Core Team, "R: A Language and Environment for Statistical Computing. 2010: Vienna, Austria."

Raji, M.A. and K.A. Schug, "Chemometric Study of the Influence of Instrumental Parameters on ESI-MS Analyte Response Using Full Factorial Design," International Journal of Mass Spectrometry, 2009. 279(2-3): p. 100-106.

Ritter, IB., Y. Genzel, and U. Reichl, "Simultaneous Extraction of Several Metabolites of Energy Metabolism and Related Substances in Mammalian Cells: Optimization Using Experimental Design," Analytical Biochemistry, 2008. 373(2): p. 349-369.

Smith, "LC/Ms Preprocessing and Analysis With Xcms," retrieved from <http://137.131.20.83/download/xcmsPreprocess.pdf>, (Dec. 7, 2005) pp. 1-13.

Smith, C.A., et al., "XCMS: Processing Mass Spectrometry Data for Metabolite Profiling Using Nonlinear Peak Alignment, Matching, and Identification," Analytical Chemistry, 2006. 78(3): p. 779-787.

Wuolikainen, A., et al., "Optimization of Procedures for Collecting and Storing of CSF for Studying the Metaholome in ALS," Amyotrophic Lateral Sclerosis, 2009. 10(4): p. 229-U8.

Zhou, Y., et al., "An Experimental Design Approach Using Response Surface Techniques to Obtain Optimal Liquid Chromatography and Mass Spectrometry Conditions to Determine the Alkaloids in Meconopsi Species," Journal of Chromatography A, 2009. 1216(42): p. 7013-7023.

* cited by examiner

OPTIMIZATION OF DATA PROCESSING PARAMETERS

TECHNICAL FIELD

The description describes, generally, computer-based methods and apparatuses, including computer program products, for optimizing data processing parameters.

BACKGROUND

Data is often analyzed (and experimented with) using data processing algorithms (e.g., to automate the data analysis). The data processing algorithms can include a set of data processing parameters that can be set and/or adjusted to configure how the algorithm processes the data. Typically, sample data (e.g., real-world data) is collected and used to configure the data processing parameters for a particular experiment. For example, input and output data for a particular process can be collected and used to generate a model for the experiment. The data processing parameters for the data processing algorithm(s) used in the experiment can be adjusted based on the model (e.g., so the data processing algorithm(s) can predict unknown output data based on available input data). Often, the configuration of the data processing parameters impacts the efficiency of data analysis and experimentation.

As an example, metabolomics generally refers to the systematic study of the unique chemical fingerprints that specific metabolic processes leave behind; specifically, metabolomics is the study of the small-molecule metabolite profiles of the fingerprints. The by-products of metabolic processes are referred to as metabolites. A metabolome represents the collection of metabolites in a biological cell, tissue, organ or organism, which are the end products of cellular processes. Metabolic profiling can give a snapshot of the physiology of a cell, which advantageously provides insight into what is happening to a cell (e.g., during a cellular process).

Studies in the field of metabolomics often involve several steps to proceed from a hypothesis (e.g., a group or category of metabolites of interest, such as fatty acids, oxidized lipids, nucleosides etc.) to biological interpretation. These steps may include experimental planning, sampling, storage and pretreatment of data samples, instrumental analysis, data processing and multivariate statistical modeling, validation and/or interpretation. The end result of a metabolomic study can be highly dependent on how well each step in this exemplary chain of events has been conducted. Therefore, the quality of an end result depends on the weakest link of the process. For example, one poorly conducted processing step can compromise the entire experiment or evaluation).

In order to extract interpretable, reliable and reproducible information, standardized protocols for many of these metabolomics experimentation steps have been proposed. However, some of the experimentation steps have not been standardized, such as the data processing step. Therefore, the data processing step remains to be optimized, for example, based on user experience in a trial-and-error fashion, or by using default settings for data processing parameters.

Usually the quality of the results in the metabolomics data processing stage is determined by the quantity of detected spectral peaks in a particular sample, without regard to the quality of individual peaks and/or the proportion of noisy peaks or other signal artifacts (which may be unrelated to the actual samples and/or the underlying hypothesis). The peaks represent, for example, small-molecule metabolites (such as metabolic intermediates, hormones and other signaling molecules, and secondary metabolites) to be found within a biological sample. However, if noisy peaks and/or peaks unrelated to the sample are not removed, such peaks can limit the reliability of the results.

For example, in untargeted metabolomics analysis, the objective is to find as many potential biomarkers as possible associated with the underlying hypothesis, with relatively little a priori information. In the data processing step, the task of optimizing the data processing parameter settings becomes difficult, because there is no easy and accurate way of assessing the quality of an integrated spectral peak without extensive statistical testing and investigation of the variables from a perspective of biological context. However, extensive statistical testing and investigation requires both time and resources often not available at the data processing stage.

SUMMARY

Software applications are available for processing metabolomics data (both commercial and open source applications). The data processing pipeline for many of these software applications often consists of several stages (e.g., filtration and feature detection, alignment procedures, and/or normalization). In each stage, different processing methods can be available that, in turn, are associated with several data processing parameters that can be varied in either a continuous or discrete fashion.

The quality of the processed data often relies heavily on properly configuring the data processing parameters. The number of peaks obtained from a certain set of data processing parameters can range from a couple of hundred peaks to several thousand peaks. More peaks do not necessarily mean better results unless, for example, reliable peaks that correctly correspond to real phenotype differences in the sample species can be distinguished from unreliable, noisy artifacts and other unidentifiable peaks. Changing parameter settings often yields differing numbers of peaks and/or peaks that themselves are different. For example, the mass, retention time, and area of the peaks may differ, making it difficult (and/or time-consuming) to compare and rank the quality of the resulting peaks based on different data processing parameter settings.

In one aspect, there is a computerized method. The method includes receiving, by a computing device, a data set representing a plurality of samples. The method includes processing, by the computing device, the data set using a data processing algorithm that includes one or more processing stages, each stage using a first respective set of data processing parameters to generate processed data. The method includes generating for the data processing algorithm, by the computing device, a design of experiment model based on the processed data and a set of response values. The method includes calculating for each stage of the data processing algorithm, by the computing device, a second respective set of data processing parameters based on at least the design of experiment model.

Another aspect features a computer program product. The computer program product is tangibly embodied in a non-transitory computer readable medium and includes instructions being configured to cause a data processing apparatus to receive a data set including a plurality of samples. The computer program product includes instructions being configured to cause a data processing apparatus to process the data set using a data processing algorithm that includes one or more processing stages, each stage using a first respective set of data processing parameters to generate processed data. The computer program product includes instructions being configured to cause a data processing apparatus to generate for the data processing algorithm a design of experiment model based on the processed data and a set of response values. The computer program product includes instructions being configured to cause a data processing apparatus to calculate for each stage of the data processing algorithm a second respective set of data processing parameters based on at least the design of experiment model.

Yet another aspect features an apparatus. The apparatus includes a receiving module configured to receive a data set including a plurality of samples. The apparatus includes an initial processing module in communication with the receiving module configured to process the data set using a data processing algorithm that includes one or more processing stages, each stage using a first respective set of data processing parameters to generate processed data. The apparatus includes a design of experiment module in communication with the initial processing module configured to generate for the data processing algorithm a design of experiment model based on the processed data and a set of response values. The design of experiment module is configured to calculate for each stage of the data processing algorithm a second respective set of data processing parameters based on at least the design of experiment model.

In other examples, any of the aspects above can include one or more of the following features. In some embodiments, calculating includes calculating a reliability index for the second set of data processing parameters, and adjusting one or more of the data processing parameters in the first set of data processing parameters based on the respective reliability index associated with each of the data processing parameters to calculate the second set of data processing parameters.

Calculating the reliability index can include calculating a concentration vector based on a pooled sample obtained from the plurality of samples, calculating a squared correlation between one or more peak vectors in the design of experiment model of the data set and the concentration vector, and calculating a ratio of reliable peaks and non-reliable peaks. A reliable peak can include a peak associated with a squared correlation value above a first predetermined threshold, and a non-reliable peak can include a peak associated with a squared correlation value below a second predetermined threshold.

In some embodiments the received data set is processed using the data processing algorithm with the second set of data processing parameters to generate a second design of experiment model. An updated reliability index can be calculated for the second set of data processing parameters, and a third set of data processing parameters can be calculated, including adjusting one or more of the data processing parameters in the second set of data processing parameters based on the updated reliability index if the updated reliability indexes satisfy a criterion.

In some embodiments, (a) generating the design of experiment model comprises generating an initial optimization design model for the first set of data processing parameters associated with the respective stage based on the processed data, and calculating comprises (b) analyzing the initial optimization design model to determine whether the first set of data processing parameters satisfies a criterion, and (c) if the first set of data processing parameters does not satisfy the criterion, calculating the second set of data processing parameters including adjusting one or more of the data processing parameters, and repeating steps (a) through (c) with the third set of data processing parameters.

Generating the initial optimization design model can involve, for example, calculating a first set of response values based on the first set of data processing parameters for the respective stage, and generating a multivariate model based on the first set of data processing parameters and the first set of response values. Calculating the first set of response values can include calculating a second set of response values based on the one or more data processing parameters for the respective stage, and generating the first set of response values based on the second set of response values by, for each response value in the second set of response values, calculating a comparison metric between the response value and the concentration vector, and if the comparison metric does not satisfy a second criterion, filtering the response value from the second set of response values.

In some embodiments, analyzing the initial optimization model includes selecting a predetermined setting of the design of experiment model, determining whether each data processing parameter associated with a first stage is within an acceptable range for the data processing parameter, if each data processing parameter is within an acceptable range, storing a value indicative of the predetermined setting not to be adjusted, and if one or more of the data processing parameters are not within an acceptable range, storing a value indicative of the predetermined setting to be adjusted.

In some embodiments, adjusting involves if a data processing parameter is within a predetermined distance of a predetermined parameter value of the data processing parameter, using the non-adjusted data processing parameter, and if a data processing parameter is not within the predetermined distance of the predetermined parameter value, adjusting the data processing parameter to be less than the predetermined distance. Calculating the second set of data processing parameters can involve determining a data processing parameter is a qualitative data processing parameter, and not adjusting the data processing parameter.

The set of data processing parameters can include at least one of a qualitative data processing parameter, a quantitative data processing parameter, or both. The data set can include mass spectroscopy data, liquid chromatography data, or both. The plurality of samples can include a plurality of solid samples, a plurality of liquid samples, a plurality of gas samples, or any combination thereof.

The techniques, which include both methods and apparatuses, described herein can provide one or more of the following advantages. A data set can be generated from a sample data set that has a high ratio of good (or reliable) data compared to bad (unreliable, noisy) data. The data set can include an increased number of good/reliable peaks or a lower number of bad/unreliable peaks. Information can be obtained from the data set, including where to look for reliable peaks in the resulting spectra based on peaks in regions overlapping with peaks with high $r^2$ values. Default settings for data processing algorithms can be optimized quickly and efficiently based on the generated data set to generate optimal data processing settings for the data processing algorithms. Therefore, the data processing algorithms can be properly configured, which facilitates accurate data analysis and experimentation.

Other aspects, features, and advantages will become apparent from the following detailed description, taken in conjunction with the accompanying drawings, illustrating the principles of the invention by way of example only.

DETAILED DESCRIPTION

In general, computerized systems and methods are provided for optimizing data processing parameters of a data processing algorithm. Data processing algorithms often include a set of processing stages (e.g., one or more processing stages). Each processing stage generally includes an associated set of data processing parameters (e.g., parameters that define how the processing stage operates, and which can be adjusted to change the functionality of the processing stage). The sets of data processing parameters can be optimized so the data processing algorithm can be executed on data to obtain a data set with a high ratio of reliable vs. non-reliable response values. The data set can be used to calculate optimal parameter settings for the sets of data processing parameters.

Referring to metabolomics, a number of methods can be used to separate components of the metabolome. Once separated and quantified, detection methods can be used to identify and/or quantify the metabolites. Separation methods include, for example, gas chromatography (GC), GC interfaced with mass spectrometry (GC-MS), high performance liquid chromatography (HPLC), and/or capillary electrophoresis (CE). There are advantages and disadvantages among the various separation methods. Modern HPLC systems have been improved, for example, to work at higher pressures, and therefore are able to use smaller particle sizes (e.g., <2 μm). The term "ultra performance liquid chromatography" (UPLC) is a registered trademark of the Waters Corporation, but is often used to refer to the more general technique of improving HPLC. CE is often appropriate for charged analytes. CE can have a higher theoretical separation efficiency than HPLC and can be suitable for use with a wider range of metabolite classes than is GC.

Detection methods are used to identify and/or quantify metabolites after separation (e.g., separation by GC, HPLC, UPLC, or CE). For example, mass spectroscopy (MS) can be used to identify and/or to quantify metabolites after separation. MS can be both sensitive and specific. MS can also be used as a stand-alone technology where, for example, the sample is infused directly into the mass spectrometer without prior separation, and the MS serves to both separate and to detect metabolites.

Although the specification and/or figures often describe(s) the techniques in terms of optimizing UPLC-MS data processing parameters, these computerized systems and methods are not limited only to UPLC-MS and work with other data processing parameters, such as those associated with GC-MS, UHPLC-MS, or CE-MS.

Figure 1:
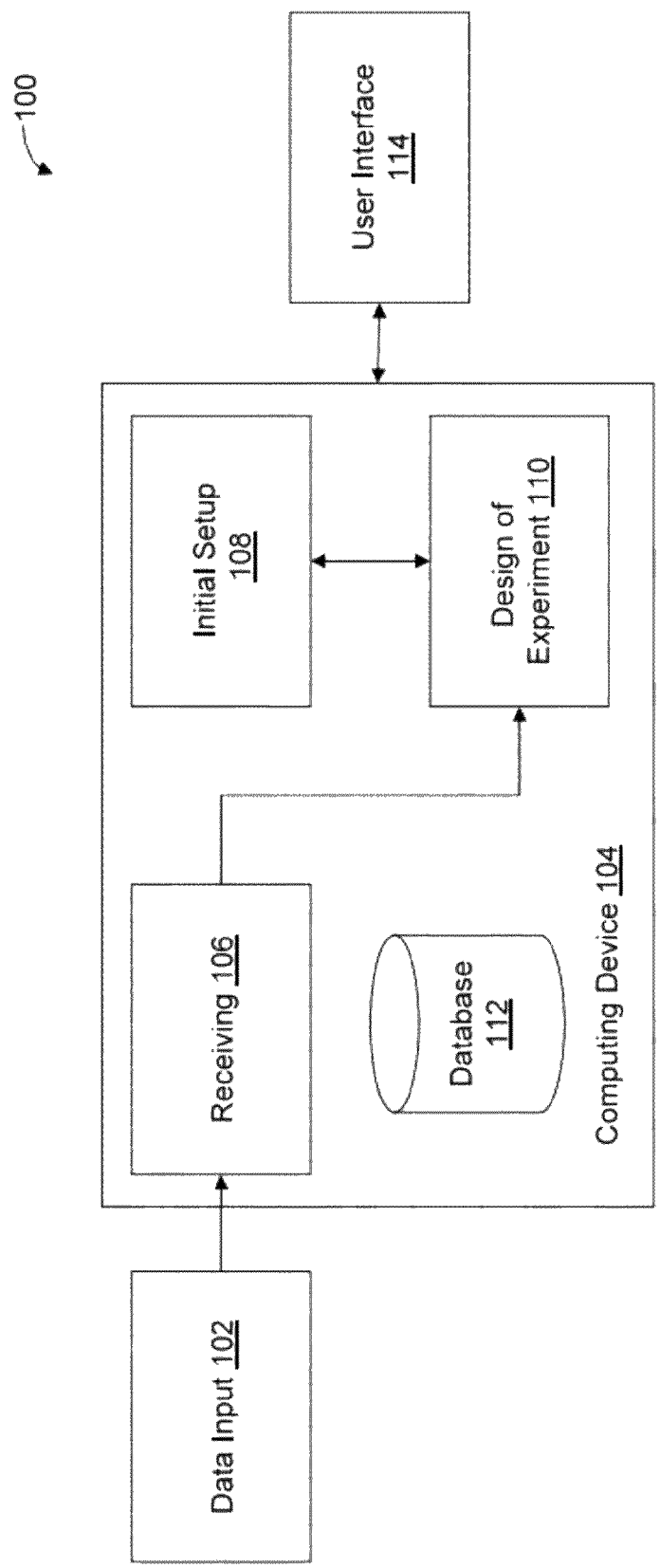
FIG. 1 is a block diagram of an optimization system for optimizing data processing parameters.

FIG. 1 is a block diagram of an optimization system 100 for optimizing data processing parameters. The optimization system includes a data input unit 102, a computing device 104, and a user interface 114. The computing device 104 includes a processor (not shown) and memory (not shown) (e.g., self-contained memory such as solid state memory or a hard drive, and/or an external database) configured to optimize data processing parameters (e.g., for processing data received from the data input unit 102). The computing device 104 is in communication with the data input unit 102 via a receiving module 106. The receiving module 106 is in communication with a design of experiment module 110. The initial setup module 108 is also in communication with the design of experiment module 110. The computing device 104 further includes a database 112.

The receiving module 106 is configured to receive data from the data input unit 102 (e.g., data sets include information or data associated with a plurality of solid, liquid, and/or gas samples). The initial setup module 108 is configured to generate data processing parameters and a protocol of data processing parameter combinations to the design of experiment module 110. The design of experiment module 110 is configured to execute one or more data processing algorithms on the data from the receiving module 106 to generate processed data (not shown) based on the data processing parameters and a protocol of data processing parameter combinations from the initial setup module 108. The processed data is, for example, in the first iteration the results of a data processing algorithm with the parameters set to preconfigured values. The design of experiment module 110 generates a design of experiment model for the data processing algorithm based on the response values and a protocol of data processing parameters. The design of experiment module 110 is further configured to calculate adjusted data processing parameters for the one or more data processing algorithms based on the first model. The user interface 114 can be any user interface to a computing device, including, for example, a keyboard, mouse, and/or graphical display.

Figure 2A:
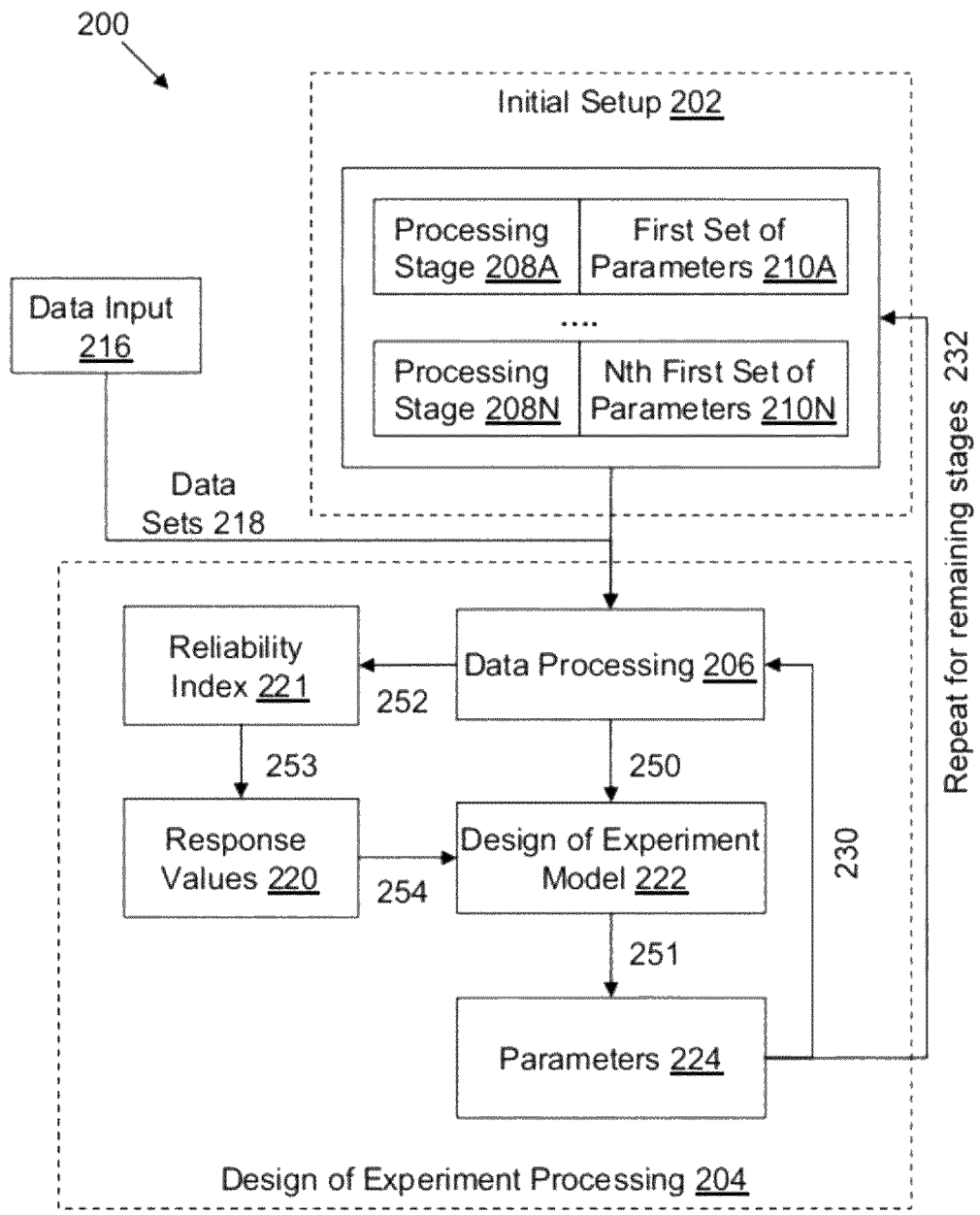
FIG. 2A is a block diagram of the logical components of the optimization system of FIG. 1.

FIG. 2A is a block diagram 200 of the logical components of the optimization system 100 of FIG. 1. The block diagram 200 includes an initial setup section 202 and a design of experiment processing section 204. As shown in the block diagram 200, the initial setup section 202 includes a first processing stage 208A associated with a first set of data processing parameters 210A, a second processing stage (not shown) associated with its first set of data processing parameters (not shown), and so on through the $N^{th}$ processing stage 208N associated with an $N^{th}$ first set of data processing parameters 210N. The processing stages 208A-208N and associated first sets of data processing parameters 210A-210N are collectively referred to as 208 and 210, respectively. The data processing parameters can include, for example, qualitative data processing parameters (e.g., categorical data), quantitative data processing parameters (e.g., numerical measurements or other measured data), or a combination of qualitative and quantitative data processing parameters. While the initial setup section 202 is depicted with multiple processing stages 208, the initial setup section 202 can include a single processing stage 208 (e.g., processing stage 208A). The initial setup section 202 outputs or provides data processing parameters and a protocol of data processing parameter combinations to the design of experiment processing section 204.

The data input unit 216 (e.g., the data input unit 102 of FIG. 1) inputs or provides data sets 218 to the design of experiment processing section 204. The design of experiment processing section 204 includes data processing algorithm 206, response values 220, a reliability index 221, a design of experiment model 222, and a definition of adjusted data processing parameters 224 (e.g., second sets of data processing parameters for one or more of the processing stages 208). For example, as described below the second set of data processing parameters can be iteratively calculated within each processing stage 208-210 of the initial setup section 202. FIG. 2A is described in further detail with respect to FIGS. 3-5.

Generally, the design of experiment model 222 optimizes the sets of data processing parameters 210 associated with processing stages 208 using an optimization algorithm (e.g., as described with reference to FIG. 4). The optimized sets of data processing parameters can be used when executing the data processing algorithm 206 on the data sets 218 to generate processed data that has a higher probability of having useful information (e.g., a high ratio of reliable peaks to non-reliable peaks). The design of experiment processing section 204 optimizes settings for each of the data processing parameters based on the design of experiment model 222.

Referring to the data processing algorithm 206, the data processing algorithm 206 can be any data processing algorithm (or software routine) configured to process the data sets 218. An exemplary software program is called XCMS, which is a liquid chromatography/mass spectroscopy—based data analysis approach. XCMS is freely-available software under open-source license, and is written in the R statistical language. A version of XCMS can be obtained at http://www-.bioconductor.org/packages/release/bioc/html/xcms.html.
For example, the factor names discussed here are used in XCMS version 1.20.0, later versions of XCMS included similar concepts, though they use different factor names. Although some examples herein describe the techniques in terms of XCMS, one skilled in the art will appreciate that the techniques can be applied to or implemented in any type of analysis software.

Figure 2B:
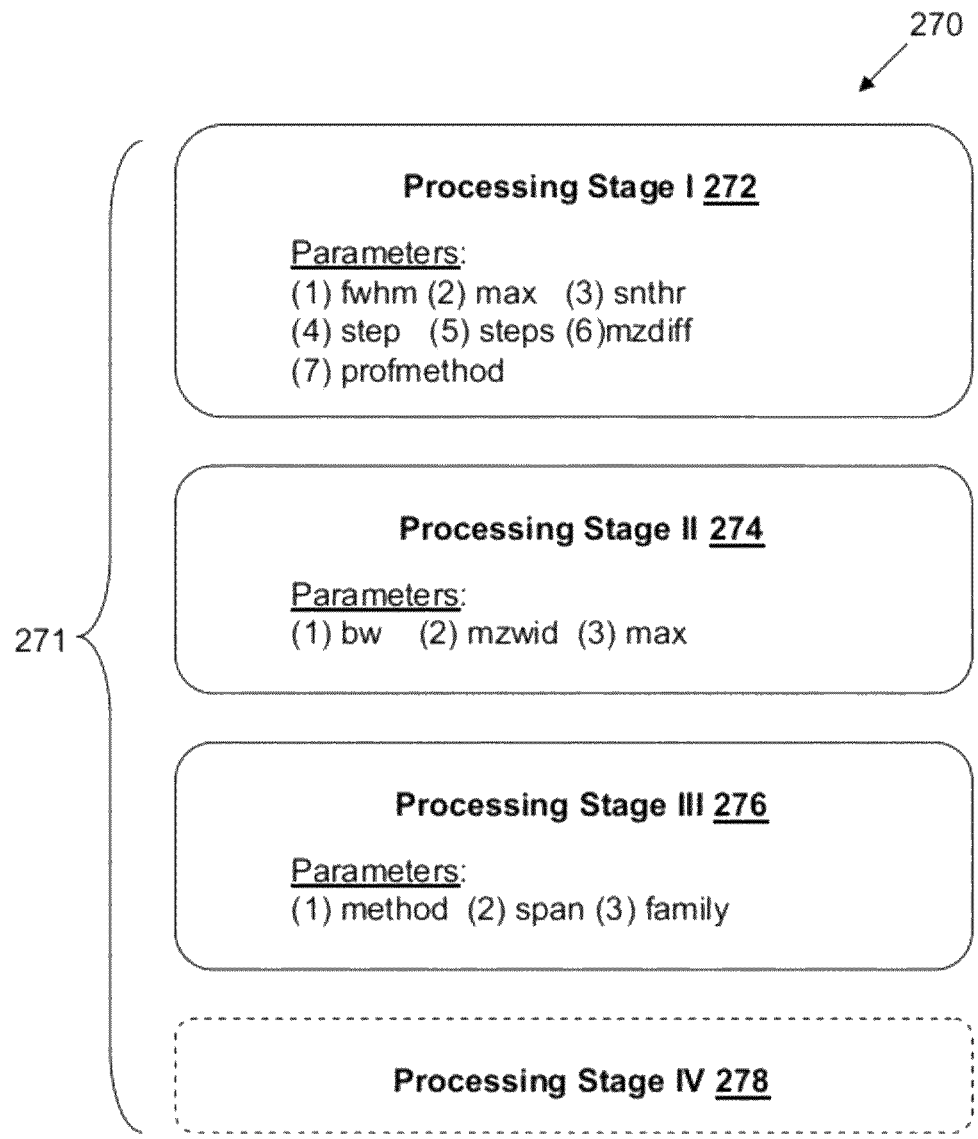
FIG. 2B is an exemplary diagram of an XCMS data processing procedure with four processing stages.

FIG. 2B is an exemplary diagram 270 of an XCMS data processing procedure 271 with four processing stages (e.g., processing stages 208 of FIG. 2A). In "Processing Stage I" 272 peaks are filtered and identified, for example, by the use of the XCMS software. A peak detection algorithm is applied sequentially on data associated with samples (e.g., on data sets 218). For example, the data processing algorithm can use the default peak picking algorithm called "matched filter." The "matched filter" algorithm includes a set of seven data processing parameters fwhm, max, snthr, step, steps, mzdiff, and profmethod (e.g., the first set of data processing parameters 210 associated with Processing Stage I 208A). The table below briefly summaries these parameters:

TABLE 1

| Parameter | Description |
| --- | --- |
| fwhm | Defines the standard deviation for the Gaussian model. |
| max | Defines a limit on the number of peaks found in each slice. |
| snthr | Defines the signal-to-noise ratio threshold for identifying peaks. |
| step | Defines the width for cutting data into slices in the mass direction. |
| steps | Defines the number of steps to merge prior to filtration. |
| mzdiff | Defines the minimum distance among peaks. |
| profmethod | Defines which of four possible methods bin, binlin, binbase, and intlin is used to arrange the raw data. |

The profmethod parameter is a qualitative parameter with four possible values bin, binlin, binlinbase, and intlin that specify how the raw data will be arranged. Processing Stage I 272 transforms the data from a paired list of mass and intensity values to a data matrix with rows of equally spaced masses and one column for each scan point. Processing Stage I 272 cuts the data sets 218 (e.g., LC-MS data) into slices in the mass direction using the parameter step to set the width. Prior to peak detection, Processing Stage I 272 filters slices using a Gaussian model shape with standard deviation from the fwhm parameter. Processing Stage I 272 defines peaks as the intensity signals exceeding the signal-to-noise ratio threshold set in the snthr parameter, with noise estimated by the mean of the unfiltered data. A limit on the number of peaks found in each slice can be set using the max parameter. In a post processing step, Processing Stage I 272 removes peaks too close to higher intensity peaks in the mass direction, based on the minimum distance required specified in the mzdiff parameter.

"Processing Stage II" 274 matches peaks across samples into peak groups based on a set of three data processing parameters bw, mzwid, and max. Processing Stage II 274 slices data in the mass domain with the width specified by the mzwid parameter. Processing Stage II 274 resolves peak groups by calculating the distribution of peaks in the chromatographic direction and identifying boundaries where many peaks have similar retention times. Processing Stage II 274 calculates the distribution using kernel density estimation, with the bw parameter specifying the standard deviation of the Gaussian smoothing kernel. A limit on the number of groups in a single m/z bin can be specified by the max parameter.

"Processing Stage III" 276 uses peak groups to identify and correct inter-sample shifts in retention time based on a set of three data processing parameters method, span, and family. Processing Stage III 276 calculates the deviation from median retention time using a set of peak groups as temporary standards. The method parameter specifies whether the algorithm should use a linear or non-linear function to model deviations occurring over time. The span parameter affects the degree of smoothing that the algorithm uses in the local polynomial regression fitting. Processing Stage III 276 performs Outlier detection if specified in the family setting.

The XCMS data processing procedure re-runs Processing Stage II 274 after Processing Stage III 276 to adjust for peaks shifting in and/or out of peak groups when retention time is corrected. In some embodiments, XCMS operates bi-directionally. For example, processing between Processing Stage II 274 and Processing Stage III 276 can be carried out in cycles (iteratively). In some embodiments, the workflow can run from Processing stage II 274 to Processing stage III 276, and also that the workflow runs from Processing stage III 276 to Processing stage II 274. Different settings can be used during different iterations.

"Processing Stage IV" 278 fills in missing peak data. Another solution to penalize for missing peaks can include setting the peak area to zero whenever a peak is not detected in a sample. Unstable peaks can be removed (e.g., peaks that fail to satisfy a stability criteria) by discarding a peak and removing the peak from subsequent analysis if the peak is missing in more than half of the samples. Missing peaks can occur, for example, due to unfavorable settings in the peak detection algorithm, by being low-abundant and therefore below a detection limit, or simply because the metabolite is not present in the sample. Some experiments can assure metabolite presence detection by using a pooled sample. Because Processing Stage IV 278 is optional (as indicated with dotted lines in FIG. 2B), the examples described herein are further described without reference to Processing Stage IV 278.

Figure 2C:
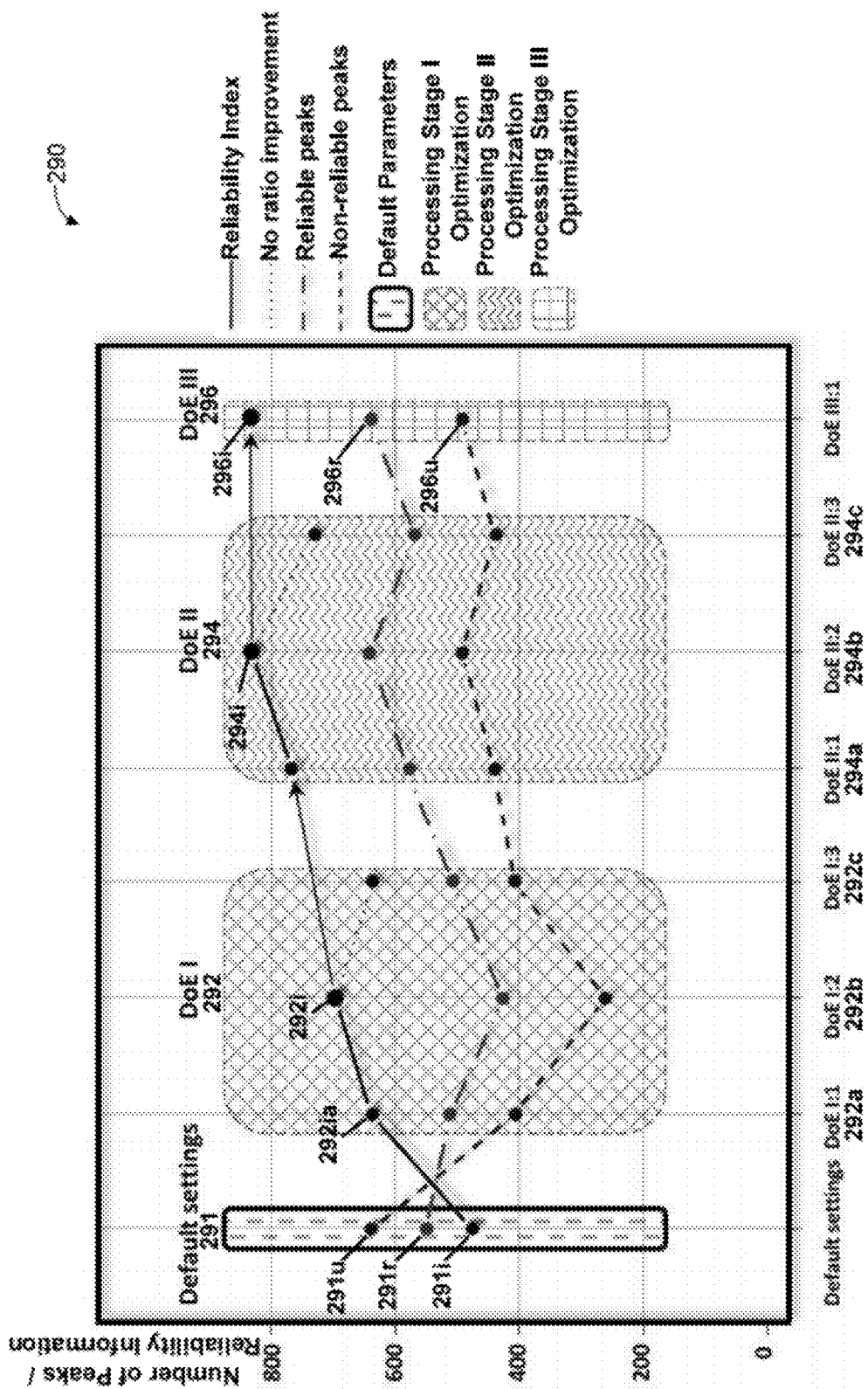
FIG. 2C is an exemplary diagram depicting the progression of the reliability index during XCMS optimization.

FIG. 2C is an exemplary diagram 290 depicting the progression of the reliability index during XCMS optimization. As shown in diagram 290, using the default data processing parameter settings 291 for the XCMS algorithm, the algorithm generated approximately 550 reliable peaks (291r) and 650 non-reliable peaks (291u). Using the optimization systems and computerized methods described herein, with default settings 291 as center points, the number of reliable peaks ($r^2 >= 0.9$) increased by 16% and the number of non-reliable peaks ($r^2 <= 0.05$) decreased by 23%, compared to using default settings. FIG. 2C is described in further detail below after the description of FIG. 5.

Figure 3:
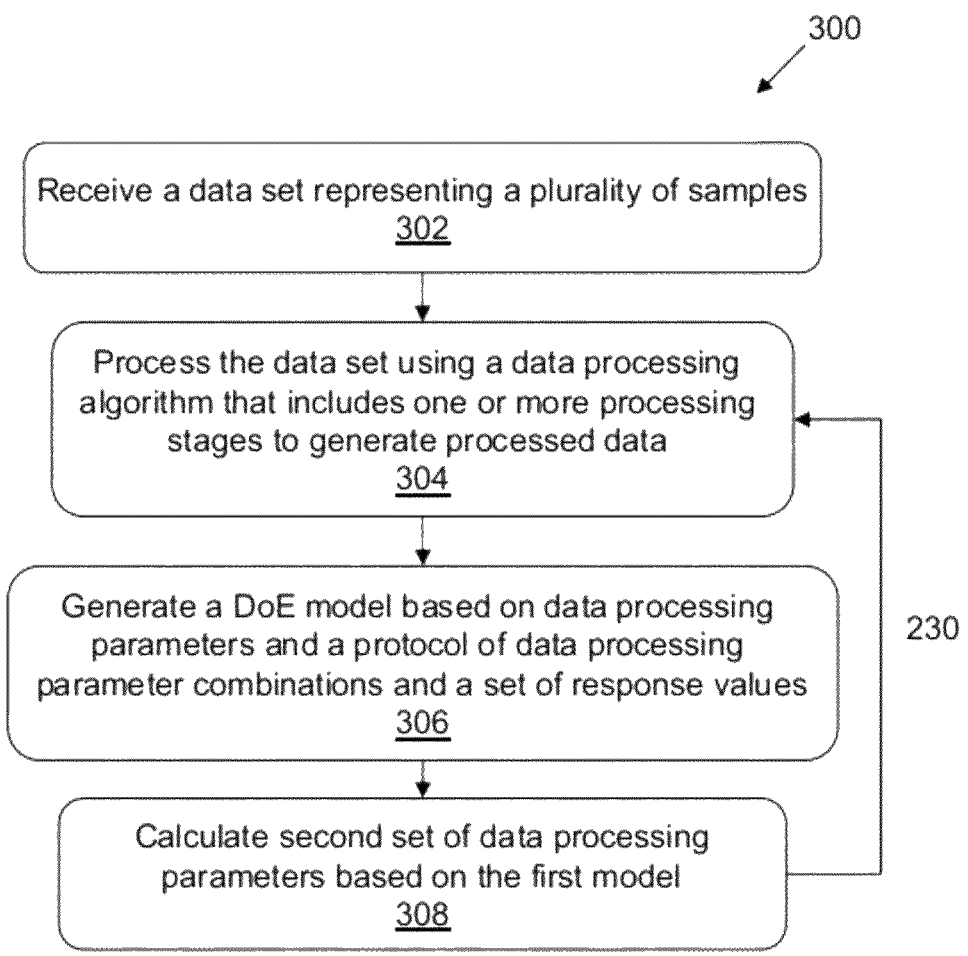
FIG. 3 is a flow chart depicting an exemplary method for generating a design of experiment model for a received data set.

While XCMS and other data processing algorithms can be used with default settings for the data processing parameters, the default settings may not provide for the optimal analysis of sample data. FIG. 3 is a flow chart 300 depicting an exemplary method for generating a design of experiment model of a received data set. Referring to FIGS. 1 and 2, at step 302 the receiving module 106 receives a data set 218. The data sets 218 represent, for example, a plurality of gas, liquid or solid samples. At step 304, the design of experiment module 110 processes the data set 218 using the data processing algorithm 206 (which includes the processing stages 208). Each processing stage 208 uses a respective first set of data processing parameters 210.

At step 306, the design of experiment module 110 generates, from the data processing algorithm 206, a design of experiment model 222 based on data processing parameters and a protocol of data processing parameter combinations generated by the initial setup section 202, and a set of response values 220. At step 308, the design of experiment module 110 calculates a second set of data processing parameters 224 (e.g., for each stage 208 of the initial setup section 202). As shown by arrow 230 in FIG. 2A, the design of experiment module 110 can iteratively calculate the second sets of parameters 224 as is described in further detail below and with respect to FIG. 4.

Referring to step 302, the plurality of samples can include solid samples, liquid samples, and/or gas samples. The data can be obtained by, for example, MS, liquid chromatography (e.g., GC-MS, HPLC-MS, UHPLC-MS, CE-MS), and/or any other separation or detection method. A pooled sample can be generated to, for example, ensure that metabolites are present in the data sets 218. The pooled sample can be diluted to create several samples constituting a concentration vector that can be used to separate reliable peaks from non-reliable peaks (e.g., assuming the relationship between peak area and sample concentration is close to linear).

For example, the samples can include data indicative of urine samples. A small volume of the original urine samples can be mixed into a pooled sample. The pooled sample can be split into two or more dilution series. The diluted samples can be analyzed using UPLC-MS to generated raw data in a three dimensional array (sample, retention time, m/z) (e.g., the data sets 218).

Referring to steps 304 and 306, the design of experiment module 110 processes the data set using the data processing algorithm 206 to generate processed data. For example, the design of experiment module 110 can execute the data processing algorithm to generate the output of the data processing algorithm based on the first sets of parameters, which the design of experiment module 110 can use to generate the design of experiment model 222. The design of experiment model 222 can be, for example, a design of experiment (DoE) model generated based on different parameter settings for a particular processing stage 208 while keeping the parameters for the remaining processing stages 208 at their default settings. A protocol of data processing parameter settings defines which different parameter settings and their ranges to be used when generating the DoE model. For example, the protocol can define sets of parameter settings that are varied around a center point for each data processing parameter (e.g., around the default setting for the parameter). A DoE approach is a statistical approach applied to introduce controlled variation so that causal relationships between parameter settings and responses can be investigated. The induced controlled variation allows variable (e.g., input variables, output responses) effects and interactions to be observed or detected and separated from noise using statistical methods (e.g., multiple linear regression (MLR) and/or partial least square (PLS) regression).

Referring to step 308, the design of experiment module 110 calculates the second set(s) of parameters 224 (e.g., updated parameters) for the processing stages 208. As shown by the arrow 230 in FIG. 2A, the calculation of the second set(s) of parameters 224 can be an iterative process. For example, the design of experiment module 110 can iteratively calculate a second set of parameters 224 for one or more of the processing stages 208 by proceeding from step 308 to step 304. The second set of parameters 224 can be, for example, the same set of parameters as the first set of parameters 210. For example, the design of experiment module 110 can determine that the first set of parameters 210A associated with the processing stage 208A need not be adjusted based on the design of experiment model 222, and the design of experiment module 110 does not adjust the first set of parameters 210A. In some examples, the design of experiment module 110 adjusts one or more of the parameters in the first set of parameters 210A based on the design of experiment model 222 to generate the second set of parameters 224 for the processing stage 208A.

As shown in FIG. 2A by arrow 230, the generation of the second sets of parameters can be an iterative process for each set of parameters 210, e.g. within each stage. For example, the design of experiment model 222 can include different results generated by the data processing algorithm 206 processing the data sets 218 with different parameter settings than those in the first set of parameters 210A (e.g., where the first set of parameters 210A is the default set of parameters used for the data processing algorithm 206). The remaining sets of data processing parameters 210 can be held constant when generating the design of experiment model 222.

Referring to the XCMS program described above with reference to FIG. 2B, the data sets 218 (e.g., raw UPLC-MS data) are processed using different data processing parameter settings for Processing Stage I 272 around the default values for the Processing Stage I 272 parameters. The output from the data processing algorithm 206 can include, for each data processing parameter setting, a two-dimensional table (e.g., sample, peak) with integrated peak areas. The settings for Processing Stage II 274 and Processing Stage III 276 can be kept at default values while calculating the design of experiment model 222. For example, steps 306 and 308 can be calculated for Processing Stage I 272 first, for Processing Stage II 274 next with the calculated values for Processing Stage I 272 kept constant, and then for Processing Stage III 276 with the calculated values for Processing Stage I 272 and II kept constant.

Figure 4:
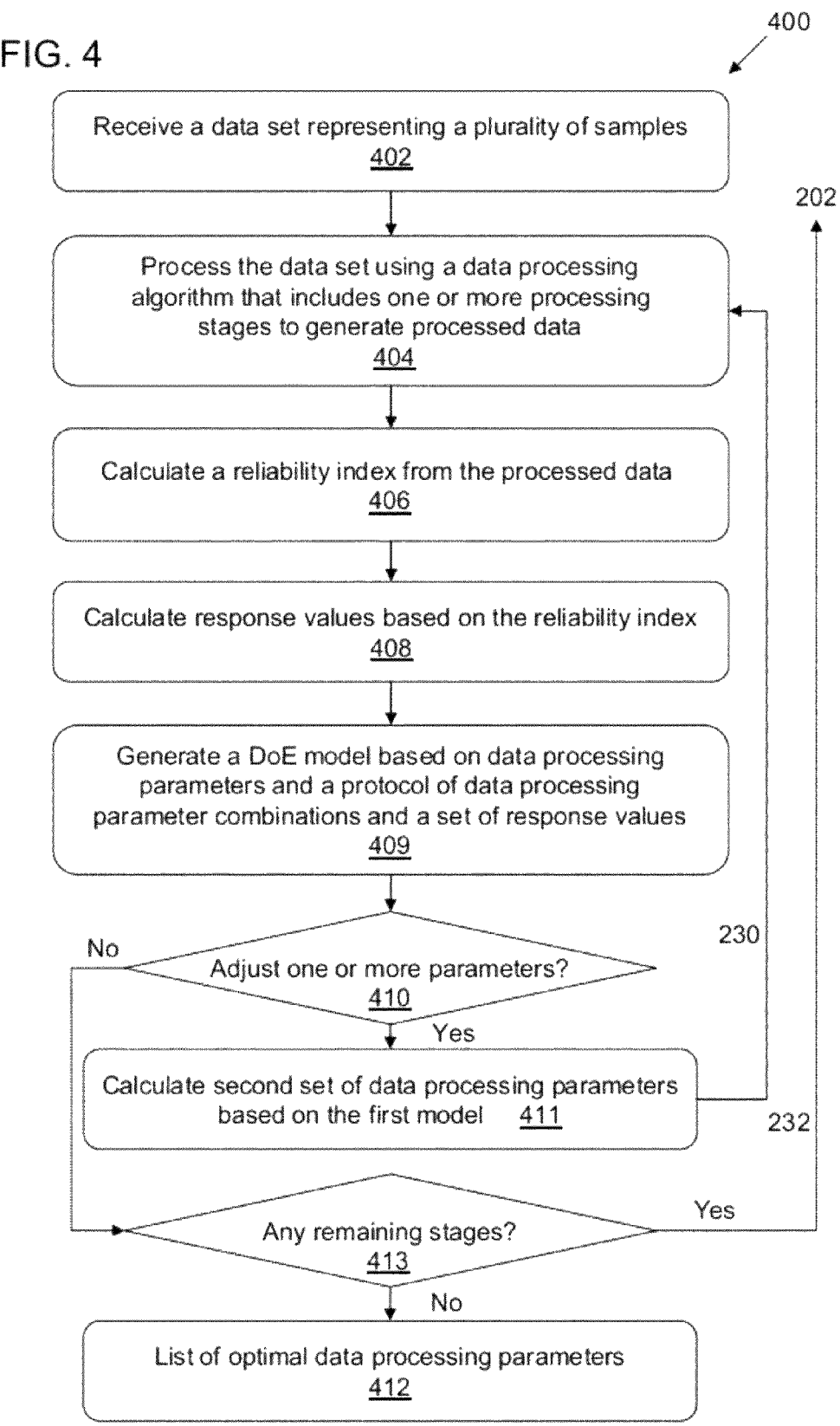
FIG. 4 is a flow chart depicting an exemplary method for calculating the second set(s) of data processing parameters

FIG. 4 is a flow chart 400 depicting an exemplary method for calculating the second set(s) of data processing parameters 224 based on the design of experiment model of the received data set 218 and the corresponding response values. The flow chart 400 can represent a process or routine run at step 302-308 of FIG. 3. Referring to FIGS. 1 and 2, at step 402 the receiving module 106 receives a data set 218. At step 404, the design of experiment module 110 processes the data set 218 using the data processing algorithm 206 (which includes the processing stages 208) for a set of data processing parameters. At step 406, the design of experiment module 110 calculates a reliability index from the processed data. At step 408, the design of experiment module 110 calculates response values 220 based on the reliability index. At step 409, the design of experiment module 110 generates, from a design of experiment model 222 based on data processing parameters and a protocol of data processing parameter combinations generated by the initial setup section 202, and a set of response values 220.

At step 410, the design of experiment module 110 determines whether to adjust one or more parameters for the set of data processing parameters. If the design of experiment module 110 determines one or more parameters for the set of parameters are to be adjusted based on the updated reliability index, the method proceeds to step 411 and calculates a second set of data processing parameters 224 (e.g., by adjusting one or more parameters in the set of data processing parameters if the response values satisfies a criterion). The method proceeds from step 411 back to step 404. For example, as shown in FIG. 2A, arrow 230 shows the data processing algorithm 206 is iteratively run within each data processing stage. If the design of experiment module 110 determines that none of the parameters in the set of parameters need to be adjusted, the method 400 proceeds to step 413. At step 413, the design of experiment module 110 determines whether all data processing stages (e.g., all data processing stages 208) have been analyzed using method 400. If the design of experiment module 110 determines that one or more data processing stages need to be analyzed, the method proceeds back to 202 in FIG. 2A for a next data processing stage. For example, as shown in FIG. 2A, arrow 232 shows that the initial setup 202 and the design of experiment processing 204 is repeated for each data processing stage 208. If the design of experiment module 110 determines that no more data processing stages need to be analyzed, the method proceeds to step 412 to complete the list of optimal data processing parameters.

As described above with reference to FIG. 4, if the design of experiment module 110 only counts the detected peaks for the response values and optimizes the data processing parameter settings towards this counted number, the process may undesirably produce false positives and/or noisy variables in the processed data. Advantageously, the design of experiment module 110 can include peak quality as a criterion in the optimization.

Referring to step 410, the design of experiment module 110 uses the response values to determine whether or not to adjust the first set of parameters 210 associated with a processing stage 208. Advantageously, the design of experiment module 110 can apply or simulate various combinations of adjusted parameters for a processing stage 208 and use the response values to select the optimal combination (if any). The design of experiment module 110 can generate the second set of parameters 224 for the processing stage 208 (step 411) as described with respect to FIG. 5. Referring to step 406, according to some embodiments the design of experiment module 110 calculates the reliability index by (a) calculating a concentration vector (e.g., based on a pooled sample obtained from the plurality of samples), (b) calculating a squared correlation between one or more peak vectors in the first model of the data set and the concentration vector, and (c) calculating a ratio between a number of reliable peaks and a number of non-reliable peaks. Regarding step (c), a reliable peak can include, for example, a peak associated with a squared correlation value above a first predetermined threshold. A non-reliable peak can include, for example, a peak associated with a squared correlation value below a second predetermined threshold.

In some embodiments, for each set of data processing parameters (referred to herein as a set of data processing parameter settings) used to generate the design of experiment model 222, the design of experiment module 110 calculates a reliability index 221. The reliability index 221 can be a squared correlation $r^2$ between each peak vector and the concentration vector. The squared correlation $r^2$ (e.g., a coefficient of determination) can provide a measure of how well future outcomes are likely to be predicted by the design of experiment model 222. For each set of data processing parameter settings, the number of reliable peaks and the number of non-reliable peaks can be counted to generate two response vectors for each set of data processing parameter settings. For example, reliable peaks can be defined as peaks with high correlations (e.g., peaks where $r^2 >= 0.9$). Non-reliable peaks can be defined as peaks with low correlations (e.g., peaks where $r^2 <= 0.05$). The design of experiment module 110 can calculate the optimal set of data processing parameter settings by optimizing the reliability index of reliable and non-reliable peaks according to Equation 1:

$$\text{Reliability Index} = (\text{number of reliable peaks})^2/(\text{number of non-reliable peaks}) \quad \text{Eq. 1}$$

Referring to step 411, for example, the design of experiment module 110 calculates the second set of parameters 224 (e.g., an adjusted set of parameters) for the associated processing stage 208 based on the response values. For example, the design of experiment module 110 calculates the second set of parameters 224 by adjusting the first set of parameters 210 as described with respect to FIG. 5.

Referring to step 404 when entered from 411, the design of experiment module 110 processes the data sets 218 with the second set of data processing parameters using the data processing algorithm. The design of experiment module 110 performs step 404 to determine in 410 whether any further adjustments need to be made to the set(s) of parameters. For example, steps 404-410 can be repeated based on the second model to continue to refine the settings for a particular processing stage 208 until the reliability index of Equation 1 does not improve further (e.g., does not improve more than a predetermined amount) to generate an optimal set of data processing parameters for the processing stage of interest.

Referring to steps 304-308, if the initial setup section 202 includes a plurality of processing stages 208, the design of experiment module 110 can repeat steps 404-410 until the method reaches step 412. For example, the design of experiment module 110 can execute steps 304-308 to optimize (via design of experiment processing section 204) the first set of parameters 210A for processing stage 208A, and then execute steps 304-308 to optimize the $N^{th}$ set of parameters 210N for processing stage 208N using the previously calculated optimal set of parameters for processing stage 208A. Each optimized processing stage 208 can be processed by the design of experiment processing section 204, and then iteratively processed again through the data processing algorithm 206 as indicated by arrow 230 in FIG. 2A. Furthermore, as indicated by arrow 232, the initial setup section 202 and the design of experiment processing section 204 can be iteratively repeated for the data processing algorithm 206 to achieve optimal sets of parameters for the data processing algorithm 210.

Referring to steps 304-308, the design of experiment module 110 can process the data sets 218 with the final second sets of parameters 224 for each of the processing stages 208 of the data processing algorithm 206 to obtain a processed data set with a high ratio of reliable to non-reliable peaks. The design of experiment module 110 can obtain information from the processed data set such as, for example, where to look for reliable peaks in the resulting spectra based on peaks in regions overlapping with peaks with high $r^2$ values.

Referring to step 306, an advantage of DoE is its ability to create useful information while keeping the number of experiments low. The overall goal of DoE is to obtain the optimal information out of performed experiments by applying a statistical strategy for selecting a set of experimental settings which results in data suitable for mathematical modeling. These settings are selected to investigate the experimental region around a given starting point. The design of experiment module 110 uses a sequential DoE approach to evaluate and optimize data processing parameter settings (e.g., optimal values or ranges of optimal values) for the data processing algorithm 206.

The design of experiment module 110 (e.g., in combination with the initial setup module 108) calculates optimal data processing parameter settings for each of the processing stages 208. In some examples, the initial setup section 202 includes multiple processing stages 208, each with its own associated set of data processing parameters. The computing device 104 optimizes each set of data processing parameters. With many potential data processing parameters originating from separate processing stages 208, the design of experiment module 110 can apply the DoE approach in many alternative ways.

In some embodiments, the design of experiment module 110 optimizes each of the processing stages 208 individually and sequentially. Optimizing each of the processing stages 208 individually may not reveal possible interactions between the different processing stages 208, but can advantageously present an optimization technique that can be expanded to process initial setup sections 202 with many processing stages 208.

The design of experiment module 110 can calculate, for the initial optimization design model, an initial set of data processing parameters for the respective stage. For example, the design of experiment module 110 can analyze the modeled response values to find the optimal possible combination of data processing parameters for the selected first processing step. The model can be interpreted, for example, manually or automatically by the design of experiment module 110. For example, the design of experiment module 110 can execute an automated optimizer that calculates the optimal possible combination of all data processing parameter settings with regards to the selected response. For example, the design of experiment module 110 executes the optimizer algorithm implemented in the MODDE software by Umetrics Inc. of Umea, Sweden. The output from the optimization is the setting combinations for the data processing parameters that yield the best response values.

The design of experiment module 110 can adjust the initial optimization design model. For example, the design of experiment module 110 can determine whether the initial set of data processing parameters for the initial optimization design model is a satisfactory optimal setting. The design of experiment module 110 can analyze the initial set of data processing parameters factor by factor to determine whether or not an optimum is found for the data processing parameter within predetermined limits. For example, the predetermined limits are a lowest data processing parameter value and a highest data processing parameter value. The predetermined limits can be based on a center value (or target value) for the data processing parameter.

The design of experiment module 110 can analyze the initial optimization model by analyzing predetermined settings of the design of experiment model 222. The design of experiment module 110 can determine whether each data processing parameter (e.g., from the first set of data processing parameters 210) associated with a first stage (e.g., processing stage 208A) is within an acceptable range for the data processing parameter. For example, for each data processing parameter, the design of experiment module 110 can grade the data processing parameter value distance from a predetermined center point value (e.g., a known optimal value) for the data processing parameter in percent of the data processing parameter step length. The data processing parameter step length can be defined as, for example, the distance of the data processing parameter value from a low data processing parameter value to a high data processing parameter value (e.g., endpoints of an acceptable range). The distance of a value from the center point is shown by the equation below:

$$\text{Distance} = \text{Absolute value}[(\text{center point} - \text{value})/(\text{step length})] \qquad \text{Eq. 2}$$

For example, if the low parameter is 0.5 and the high parameter is 1.5, the step length is 1.5−0.5=1. The distance of the value of 1.25 from the center point is the absolute value of (1−1.25)/1=0.25, or 25% of the step length towards the upper limit. In some examples, the low data processing parameter value is a predetermined distance or amount below the center point value, and the high data processing parameter value is the same predetermined distance or amount above the center point value. Therefore, the design points are on both side of the center point value and therefore the distance can have a direction from the center point (e.g., either towards the high data processing parameter value or towards the low data processing parameter value). The design of experiment module 110 can advantageously use the direction to adjust the data processing parameter under evaluation (e.g., to calculate a second set of parameters 224).

If the design of experiment module 110 determines each data processing parameter is within an acceptable range, the design of experiment module 110 stores a value (e.g., a variable) that indicates the predetermined settings (e.g., the center, minimum and maximum values for each data processing parameter) do not need to be adjusted. If the design of experiment module 110 determines one or more of the data processing parameters are not within an acceptable range, the design of experiment module 110 stores a value that indicates the predetermined settings are to be adjusted.

In some embodiments, if the design of experiment module 110 determines that a data processing parameter is within a predetermined distance of a predetermined parameter value of the data processing parameter, the design of experiment module 110 can use the non-adjusted settings. For example, if the design of experiment module 110 determines that all of the data processing parameters in the initial set of data processing parameters are located within a predetermined distance or amount from their associated center points, the design of experiment module 110 can proceed to optimize the next processing stage 208 in the initial setup section 202 (if there is another processing stage). For example, if the design of experiment module 110 determines a data processing parameter is less than 25% of its step length away from the center point, then the design of experiment module 110 does not adjust the settings.

If the design of experiment module 110 determines that a data processing parameter is not within the predetermined distance of the predetermined parameter value, an adjustment of the data processing parameters will be made. For example, if the design of experiment module 110 determines that one or more data processing parameters have an optimal setting not located close to the center point, the design of experiment module 110 can revise the initial optimization design model.

The design of experiment module 110 can adjust the data predetermined settings (e.g., the center, minimum and maximum values for the data processing parameters that are used to generate the initial optimization design model). The design of experiment module 110 can adjust the settings for one or more of the data processing parameters. The design of experiment module 110 can adjust the settings for each data processing parameter based on how far away from the center point the optimal parameter settings for each data processing parameter with regards to the selected response is located. For example, if the design of experiment module 110 determines that the optimal parameter setting for a data processing parameter is within a predetermined distance (e.g. <=1%) from a data processing parameter limit (e.g., a maximum or a minimum), the design of experiment module 110 can adjust the settings for the data processing parameter by 25%.

Figure 5:
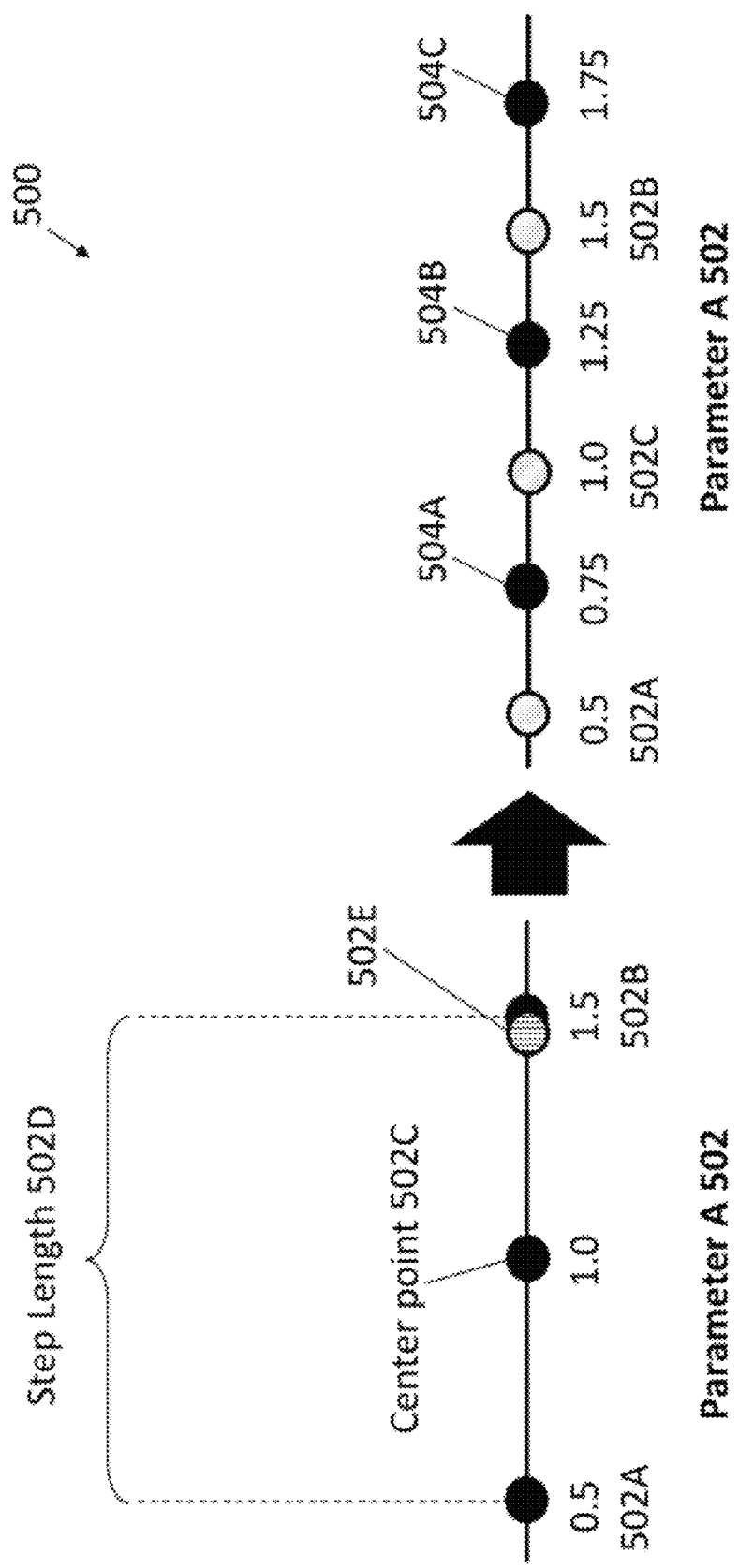
FIG. 5 is an exemplary diagram depicting adjustment of a data processing parameter by 25%.

FIG. 5 is an exemplary diagram 500 depicting adjustment of data processing parameter A 502 by 25%. For parameter A 502, the low parameter value, e.g., a minimum parameter value, is 0.5 (502A) and the high parameter value, e.g., a maximum parameter value, is 1.5 (502B). The center point is 1.0 (502C). The step length (502D) is the high parameter value 502B minus the low parameter value 502A=1.5−0.5=1. The optimal parameter setting for parameter A 502 is 1.4999 (502E). Because the optimal parameter setting 502E is within 1% of the maximum, the design of experiment module 110 adjusts the parameter settings for parameter A 502 by 25% toward the upper limit. A 25% adjustment toward the upper limit 502B results in a new upper limit of 1.75 (504C), a new center point of 1.25 (504B) and a new lower limit of 0.75 (504A). If the design of experiment module 110 determines that the optimal parameter setting for a data processing parameter value is located between 25% of the step length from the center point and within a predetermined distance (e.g. >1%) from maximum (or minimum) data processing parameter setting, the design of experiment module 110 can adjust the data processing parameter limits by 10% in the direction from the center point. For example, a factor with a lower limit of 15, a center point of 30 and an upper limit of 45 and an optimal parameter setting of 20 would be adjusted with 10% towards the lower limit. A 10% adjustment toward the lower limit would result in a new lower limit of 12, a new center point of 27 and a new upper limit of 42.

In some embodiments, the design of experiment module 110 can adjust the data processing parameters based on the type of data processing parameter. For example, if the design of experiment module 110 determines a data processing parameter is a qualitative data processing parameter, the design of experiment module 110 can leave the data processing parameter as-is without adjusting the parameter. In some embodiments, the design of experiment module 110 adjusts settings for data processing parameters with discrete settings by a full step.

An exemplary application of the XCMS software described with reference to FIG. 2B is discussed below. Processing Stage I 272, Processing Stage II 274, and Processing Stage III 276 were sequentially analyzed in this example. FIG. 2C shows the progression of the optimization of the XCMS software, as is explained below. The default settings 291 in FIG. 2C shows that using the default data processing parameter settings 291 for the XCMS algorithm, the algorithm generated approximately 550 reliable peaks 291*r* and 650 non-reliable peaks 291*u*.

As described above, Processing Stage I 272 has six quantitative data processing parameters and one qualitative data processing parameter with four settings. The parameters for Processing Stage I 272 are generally related to peak width, signal/noise ratio cutoff and profile generation. DoE I 292 in FIG. 2C represents the design of experiment processing performed for the Processing Stage I 272 parameters. The data processing parameters for Processing Stage I 272 were varied around their default settings 291, which acted as the center point. For this example, at least three iterations (230) 292*a*-292*c* for all data processing parameters were examined with a reduced, and balanced, optimization design in 84 runs (that included repetitions in selected settings).

After modeling the reliability index 292*ia* with MLR (shown in FIG. 2C as DoE I:1 292*a*), the MODDE optimizer was run (e.g., the optimization process described above in FIG. 3). The resulting optimal settings for the initial optimization model were interpreted, which indicated an optimum outside the investigated region and therefore the design limit settings for the data processing parameters were adjusted as described above with reference to FIG. 4. The first adjusted design for Processing Stage I 272 (shown in FIG. 2C as DoE I:2 292*b*) was a copy of the initial optimization design model, but with new limits on some of the data processing parameters. The results of this design resulted in a higher reliability index but still indicated the possibility of a higher reliability index with new limits on some of the data processing parameters, so a second adjusted design was calculated. The second adjusted design (shown in FIG. 2C as DoE I:3 292*c*), resulted in a lower reliability index than the reliability index 292*i* at DoE I:2 292*b*, and therefore no further designs for Processing Stage I 272 were made. The optimal parameter setting, associated with DoE I:2 292*b*, was used in subsequent designs for Processing Stages II and III.

The same protocol as with DoE I was performed on Processing Stage II 274 by applying an XCMS grouping algorithm density. DoE II 294 in FIG. 2C represents the design of experiment processing performed for the Processing Stage II 274 parameters. First an initial design was run (shown in FIG. 2C as DoE II:1 294*a*), which then was followed by two adjusted designs (shown in FIG. 2C as DoE II:2 294*b* and DoE II:3 294*c*). The design used for this step was a central composite face (CCF) design with three parameters, 16 experiments in total including two center points. The second adjusted design DoE II:3 294*c* resulted in a lower reliability index than the reliability index 294*i* at DoE II:2 294*b*, and therefore no further designs for Processing Stage II 274 were made. The optimal parameter setting, associated with DoE II:2 294*b*, was used in subsequent designs for Processing Stage III.

For Processing Stage III 276, the XCMS alignment algorithm peakgroups was applied, which has two qualitative factors (with two settings each) and one quantitative factor. DoE III 296 in FIG. 2C represents the design of experiment processing performed for the Processing Stage III 276 parameters. The design used was a full factorial with four points situated at mid edges (for the quantitative factor) which was repeated. In total 16 experiments were performed. An initial design was run (DoE III 296), but no significant model could be found and therefore no adjusted designs were performed. The experimental setting giving the highest reliability index 296*i* was selected as the optimal setting. As shown by DoE III 296, the number of reliable peaks 296*r* ($r^2 >= 0.9$) was increased by 16% and the number of non-reliable peaks 296*u* ($r^2 <= 0.05$) was decreased by 23% (with a reliability index 296*i*), compared to using default settings 291.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit). Subroutines can refer to portions of the computer program and/or the processor/special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage devices suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The computing system can include clients and servers. A client and a server are generally remote from each other and typically interact through a communication network. The relationship of client and server arises by virtue of computer programs running on the respective computers and having a client-server relationship to each other.

The components of the computing system can be interconnected by any form or medium of digital or analog data communication (e.g., a communication network). Examples of communication networks include circuit-based and packet-based networks. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

Devices of the computing system and/or computing devices can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). A mobile computing device includes, for example, a Blackberry®. IP phones include, for example, a Cisco® Unified IP Phone 7985G available from Cisco System, Inc, and/or a Cisco® Unified Wireless Phone 7920 available from Cisco System, Inc.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computerized method comprising:
   receiving, by a computing device, a data set representing a plurality of samples, the plurality of samples comprises a plurality of solid samples, a plurality of liquid samples, a plurality of gas samples, or any combination thereof;

processing, by the computing device, the data set using a data processing algorithm that includes one or more processing stages, each stage using a first respective set of data processing parameters to generate processed data;

generating for the data processing algorithm, by the computing device, a design of experiment model based on the processed data and a set of response values; and calculating for each stage of the data processing algorithm, by the computing device, a second respective set of data processing parameters based on at least the design of experiment model;

calculating a reliability index for the second set of data processing parameters; and adjusting one or more of the data processing parameters in the first set of data processing parameters based on the respective reliability index associated with each of the data processing parameters to calculate the second set of data processing parameters.

2. The method of claim 1, wherein calculating the reliability index comprises:

calculating a concentration vector based on a pooled sample obtained from the plurality of samples;

calculating a squared correlation between one or more peak vectors in the design of experiment model and the concentration vector; and calculating a ratio of reliable peaks and non-reliable peaks.

3. The method of claim 2 wherein:

a reliable peak comprises a peak associated with a squared correlation value above a first predetermined threshold, and a non-reliable peak comprises a peak associated with a squared correlation value below a second predetermined threshold.

4. The method of claim 1, further comprising, processing the received data set using the data processing algorithm with the second set of data processing parameters to generate a second design of experiment model.

5. The method of claim 4 further comprising:

calculating an updated reliability index for the second set of data processing parameters; and calculating a third set of data processing parameters comprising adjusting one or more of the data processing parameters in the second set of data processing parameters based on the updated reliability index if the updated reliability indexes satisfy a criterion.

6. The method of claim 1 wherein:

(a) generating the design of experiment model comprises generating an initial optimization design model for the first set of data processing parameters associated with the respective stage based on the processed data; and wherein calculating comprises:

(b) analyzing the initial optimization design model to determine whether the first set of data processing parameters satisfies a criterion; and (c) if the first set of data processing parameters does not satisfy the criterion:

calculating the second set of data processing parameters comprising adjusting one or more of the data processing parameters; and repeating steps (a) through (c) with the third set of data processing parameters.

7. The method of claim 6 wherein generating the initial optimization design model comprises:

calculating a first set of response values based on the first set of data processing parameters for the respective stage; and generating a multivariate model based on the first set of data processing parameters and the first set of response values.

8. The method of claim 7 wherein calculating the first set of response values comprises:

calculating a second set of response values based on the one or more data processing parameters for the respective stage;

generating the first set of response values based on the second set of response values by, for each response value in the second set of response values:

calculating a comparison metric between the response value and the concentration vector; and if the comparison metric does not satisfy a second criterion, filtering the response value from the second set of response values.

9. The method of claim 6 wherein analyzing the initial optimization model comprises:

selecting a predetermined setting of the design of experiment model;

determining whether each data processing parameter associated with a first stage is within range for the data processing parameter;

if each data processing parameter is within the range, storing a value indicative of the predetermined setting not to be adjusted; and if one or more of the data processing parameters are not within the range, storing a value indicative of the predetermined setting to be adjusted.

10. The method of claim 6 wherein adjusting comprises:

if a data processing parameter is within a predetermined distance of a predetermined parameter value of the data processing parameter, using the non-adjusted data processing parameter; and if a data processing parameter is not within the predetermined distance of the predetermined parameter value, adjusting the data processing parameter to be less than the predetermined distance.

11. The method of claim 6 wherein calculating the second set of data processing parameters comprises:

determining a data processing parameter is a qualitative data processing parameter; and not adjusting the data processing parameter.

12. The method of claim 1 wherein the set of data processing parameters comprises at least one of a qualitative data processing parameter, a quantitative data processing parameter, or both.

13. The method of claim 1 wherein the data set comprises mass spectroscopy data, liquid chromatography data, or both.

14. A computer program product, tangibly embodied in a non-transitory computer readable medium, the computer program product including instructions being configured to cause a data processing apparatus to:

receive a data set comprising a plurality of samples, the plurality of samples comprise a plurality of solid samples, a plurality of liquid samples, a plurality of gas samples, or any combination thereof;

process the data set using a data processing algorithm that includes one or more processing stages, each stage using a first respective set of data processing parameters to generate processed data;

generate for the data processing algorithm a design of experiment model based on the processed data and a set of response values;
calculate for each stage of the data processing algorithm a second respective set of data processing parameters based on at least the design of experiment model;
calculate a reliability index for the second set of data processing parameters; and
adjust one or more of the data processing parameters in the first set of data processing parameters based on the respective reliability index associated with each of the data processing parameters to calculate the second set of data processing parameters.

15. The computer program product of claim 14, wherein instructions to calculate the reliability index cause a data processing apparatus to:
calculate a concentration vector based on a pooled sample obtained from the plurality of samples;
calculate a squared correlation between one or more peak vectors in the design of experiment model and the concentration vector; and
calculate a ratio of reliable peaks and non-reliable peaks.

16. The computer program product of claim 15 wherein:
a reliable peak comprises a peak associated with a squared correlation value above a first predetermined threshold, and
a non-reliable peak comprises a peak associated with a squared correlation value below a second predetermined threshold.

17. The computer program product of claim 14, further comprising instructions being configured to cause a data processing apparatus to:
process the received data set using the data processing algorithm with the second set of data processing parameters to generate a second design of experiment model.

18. The computer program product of claim 17, further comprising instructions being configured to cause a data processing apparatus to:
calculate an updated reliability index for the second set of data processing parameters; and
calculate a third set of data processing parameters comprising adjusting one or more of the data processing parameters in the second set of data processing parameters based on the updated reliability index if the updated reliability indexes satisfy a criterion.

19. The computer program product of claim 14, wherein:
(a) instructions for generating the design of experiment model cause a data processing apparatus to generate an initial optimization design model for the first set of data processing parameters associated with the respective stage based on the processed data; and
wherein instructions for calculating cause a data processing apparatus to:
(b) analyze the initial optimization design model to determine whether the first set of data processing parameters satisfies a criterion; and
(c) if the first set of data processing parameters does not satisfy the criterion:
calculate the second set of data processing parameters comprising adjusting one or more of the data processing parameters; and
repeat steps (a) through (c) with the third set of data processing parameters.

20. The computer program product of claim 19, wherein instructions for generating the initial optimization design model cause a data processing apparatus to:
calculate a first set of response values based on the first set of data processing parameters for the respective stage; and
generate a multivariate model based on the first set of data processing parameters and the first set of response values.

21. The computer program product of claim 20, wherein instructions for calculating the first set of response values cause a data processing apparatus to:
calculate a second set of response values based on the one or more data processing parameters for the respective stage;
generate the first set of response values based on the second set of response values by, for each response value in the second set of response values:
calculate a comparison metric between the response value and the concentration vector; and
if the comparison metric does not satisfy a second criterion, filter the response value from the second set of response values.

22. The computer program product of claim 19, wherein instructions for analyzing the initial optimization model cause a data processing apparatus to:
select a predetermined setting of the design of experiment model;
determine whether each data processing parameter associated with a first stage is within a range for the data processing parameter;
if each data processing parameter is within the range, store a value indicative of the predetermined setting not to be adjusted; and
if one or more of the data processing parameters are not within the range, store a value indicative of the predetermined setting to be adjusted.

23. The computer program product of claim 19, wherein instructions for adjusting cause a data processing apparatus to:
if a data processing parameter is within a predetermined distance of a predetermined parameter value of the data processing parameter, use the non-adjusted data processing parameter; and
if a data processing parameter is not within the predetermined distance of the predetermined parameter value, adjust the data processing parameter to be less than the predetermined distance.

24. The computer program product of claim 18, wherein instructions for calculating the second set of data processing parameters cause a data processing apparatus to:
determine a data processing parameter is a qualitative data processing parameter; and
not adjust the data processing parameter.

25. The computer program product of claim 14, wherein the set of data processing parameters comprises at least one of a qualitative data processing parameter, a quantitative data processing parameter, or both.

26. The computer program product of claim 14, wherein the data set comprises mass spectroscopy data, liquid chromatography data, or both.

27. An apparatus comprising:
a computing device;
a receiving module in the computing device configured to receive a data set comprising a plurality of samples, the plurality of samples comprise a plurality of solid samples, a plurality of liquid samples, a plurality of gas samples, or any combination thereof;

an initial processing module in the computing device in communication with the receiving module configured to process the data set using a data processing algorithm that includes one or more processing stages, each stage using a first respective set of data processing parameters to generate processed data; and a design of experiment module in the computing device in communication with the initial processing module configured to:

generate for the data processing algorithm a design of experiment model based on the second set of data processing parameters and a set of response values, the design of experiment model determining a third set of data processing parameters for each stage of the data processing algorithm;

calculate for each stage of the data processing algorithm a second respective set of data processing parameters based on at least the design of experiment model;

calculate a reliability index for the second set of data processing parameters; and adjust one or more of the data processing parameters in the first set of data processing parameters based on the respective reliability index associated with each of the data processing parameters to calculate the second set of data processing parameters.

28. The apparatus of claim 27, wherein calculating the reliability index comprises:

calculating a concentration vector based on a pooled sample obtained from the plurality of samples;

calculating a squared correlation between one or more peak vectors in the design of experiment model and the concentration vector; and calculating a ratio of reliable peaks and non-reliable peaks.

29. The apparatus of claim 28, wherein:

a reliable peak comprises a peak associated with a squared correlation value above a first predetermined threshold, and a non-reliable peak comprises a peak associated with a squared correlation value below a second predetermined threshold.

30. The apparatus of claim 27, the design of experiment module further configured to:

process the received data set using the data processing algorithm with the second set of data processing parameters to generate a second design of experiment model.

31. The apparatus of claim 30, the design of experiment module further configured to:

calculate an updated reliability index for the second set of data processing parameters; and calculate a third set of data processing parameters comprising adjusting one or more of the data processing parameters in the second set of data processing parameters based on the updated reliability index if the updated reliability indexes satisfy a criterion.

32. The apparatus of claim 27, wherein:

(a) generating the design of experiment model comprises generating an initial optimization design model for the first set of data processing parameters associated with the respective stage based on the processed data; and wherein calculating comprises:

(b) analyzing the initial optimization design model to determine whether the first set of data processing parameters satisfies a criterion; and (c) if the first set of data processing parameters does not satisfy the criterion:

calculating the second set of data processing parameters comprising adjusting one or more of the data processing parameters; and repeating steps (a) through (c) with the third set of data processing parameters.

33. The apparatus of claim 32, wherein generating the initial optimization design model comprises:

calculating a first set of response values based on the first set of data processing parameters for the respective stage; and generating a multivariate model based on the first set of data processing parameters and the first set of response values.

34. The apparatus of claim 33, wherein calculating the first set of response values comprises:

calculating a second set of response values based on the one or more data processing parameters for the respective stage;

generating the first set of response values based on the second set of response values by, for each response value in the second set of response values:

calculating a comparison metric between the response value and the concentration vector; and if the comparison metric does not satisfy a second criterion, filtering the response value from the second set of response values.

35. The apparatus of claim 32, wherein analyzing the initial optimization model comprises:

selecting a predetermined setting of the design of experiment model;

determining whether each data processing parameter associated with a first stage is within a range for the data processing parameter;

if each data processing parameter is within the range, storing a value indicative of the predetermined setting not to be adjusted; and if one or more of the data processing parameters are not within the range, storing a value indicative of the predetermined setting to be adjusted.

36. The apparatus of claim 32, wherein adjusting comprises:

if a data processing parameter is within a predetermined distance of a predetermined parameter value of the data processing parameter, using the non-adjusted data processing parameter; and if a data processing parameter is not within the predetermined distance of the predetermined parameter value, adjusting the data processing parameter to be less than the predetermined distance.

37. The apparatus of claim 32, wherein calculating the second set of data processing parameters comprises:

determining a data processing parameter is a qualitative data processing parameter; and not adjusting the data processing parameter.

38. The apparatus of claim 27, wherein the set of data processing parameters comprises at least one of a qualitative data processing parameter, a quantitative data processing parameter, or both.

39. The apparatus of claim 27, wherein the data set comprises mass spectroscopy data, liquid chromatography data, or both.

* * * * *

UNITED STATES PATENT AND TRADEMARK OFFICE
CERTIFICATE OF CORRECTION

PATENT NO. : 8,725,469 B2  
APPLICATION NO. : 13/039818  
DATED : May 13, 2014  
INVENTOR(S) : Johansson et al.

Page 1 of 1

It is certified that error appears in the above-identified patent and that said Letters Patent is hereby corrected as shown below:

In the Claims

Column 20, in Claim 1, line 10, delete the word "and"

Column 22, in Claim 24, line 50, delete "18" and insert -- 19 --

Signed and Sealed this
Twelfth Day of August, 2014

Michelle K. Lee
*Deputy Director of the United States Patent and Trademark Office*